United States Patent
Julian et al.

(10) Patent No.: US 8,233,572 B2
(45) Date of Patent: Jul. 31, 2012

(54) INTERFERENCE MITIGATION FOR IMPULSE-BASED COMMUNICATION

(75) Inventors: David Jonathan Julian, San Diego, CA (US); Amal Ekbal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 748 days.

(21) Appl. No.: 11/861,092

(22) Filed: Sep. 25, 2007

(65) Prior Publication Data

US 2009/0080542 A1    Mar. 26, 2009

(51) Int. Cl.
*H03D 1/04* (2006.01)

(52) U.S. Cl. ........ 375/346; 375/145; 375/149; 375/265; 375/340; 375/341; 375/342

(58) Field of Classification Search ................ 375/346, 375/145, 149, 265, 340, 341, 342
See application file for complete search history.

(56) References Cited

U.S. PATENT DOCUMENTS

| | | | |
|---|---|---|---|
| 5,687,169 A | 11/1997 | Fullerton | |
| 5,764,696 A | 6/1998 | Barnes et al. | |
| 5,812,081 A | 9/1998 | Fullerton | |
| 5,832,035 A | 11/1998 | Fullerton | |
| 5,907,427 A | 5/1999 | Scalora et al. | |
| 5,952,956 A | 9/1999 | Fullerton | |
| 5,960,031 A | 9/1999 | Fullerton et al. | |
| 5,963,581 A | 10/1999 | Fullerton et al. | |
| 5,969,663 A | 10/1999 | Fullerton et al. | |
| 5,995,534 A | 11/1999 | Fullerton et al. | |
| 6,031,862 A | 2/2000 | Fullerton et al. | |
| 6,091,374 A | 7/2000 | Barnes | |
| 6,111,536 A | 8/2000 | Richards et al. | |
| 6,133,876 A | 10/2000 | Fullerton et al. | |
| 6,177,903 B1 | 1/2001 | Fullerton et al. | |
| 6,218,979 B1 | 4/2001 | Barnes et al. | |
| 6,295,019 B1 | 9/2001 | Richards et al. | |
| 6,297,773 B1 | 10/2001 | Fullerton et al. | |
| 6,300,903 B1 | 10/2001 | Richards et al. | |
| 6,304,623 B1 | 10/2001 | Richards et al. | |
| 6,351,652 B1 | 2/2002 | Finn et al. | |
| 6,354,946 B1 | 3/2002 | Finn | |
| 6,400,307 B2 | 6/2002 | Fullerton et al. | |

(Continued)

FOREIGN PATENT DOCUMENTS

GB    2269075    1/1994

(Continued)

OTHER PUBLICATIONS

International Search Report—PCT/US07/079603—International Search Authority, European Patent Office—Jul. 17, 2008.

(Continued)

*Primary Examiner* — Kabir A Timory
(74) *Attorney, Agent, or Firm* — Dang M. Vo; Paul S. Holdaway

(57) ABSTRACT

In a pulse-based communication system a transmitting device may generate a series of pulses to convey information via a communication medium to a receiving device. In some situations, interference from one or more interfering devices may alter the pulse energy as it is transmitted through the communication medium. To mitigate the effect of such interference, a receiving device may mark certain received pulses as erasures. In this way, such pulses may be ignored during the decoding operation of the receiver.

62 Claims, 10 Drawing Sheets

U.S. PATENT DOCUMENTS

| | | |
|---|---|---|
| 6,400,329 B1 | 6/2002 | Barnes |
| 6,421,389 B1 | 7/2002 | Jett et al. |
| 6,430,208 B1 | 8/2002 | Fullerton et al. |
| 6,437,756 B1 | 8/2002 | Schantz |
| 6,462,701 B1 | 10/2002 | Finn |
| 6,466,125 B1 | 10/2002 | Richards et al. |
| 6,469,628 B1 | 10/2002 | Richards et al. |
| 6,483,461 B1 | 11/2002 | Matheney et al. |
| 6,489,893 B1 | 12/2002 | Richards et al. |
| 6,492,904 B2 | 12/2002 | Richards |
| 6,492,906 B1 | 12/2002 | Richards et al. |
| 6,501,393 B1 | 12/2002 | Richards et al. |
| 6,504,483 B1 | 1/2003 | Richards et al. |
| 6,512,455 B2 | 1/2003 | Finn et al. |
| 6,512,488 B2 | 1/2003 | Schantz |
| 6,519,464 B1 | 2/2003 | Santhoff et al. |
| 6,529,568 B1 | 3/2003 | Richards et al. |
| 6,538,615 B1 | 3/2003 | Schantz |
| 6,539,213 B1 | 3/2003 | Richards et al. |
| 6,549,567 B1 | 4/2003 | Fullerton |
| 6,552,677 B2 | 4/2003 | Barnes et al. |
| 6,556,621 B1 | 4/2003 | Richards et al. |
| 6,560,463 B1 | 5/2003 | Santhoff |
| 6,571,089 B1 | 5/2003 | Richards et al. |
| 6,573,857 B2 | 6/2003 | Fullerton et al. |
| 6,577,691 B2 | 6/2003 | Richards et al. |
| 6,585,597 B2 | 7/2003 | Finn |
| 6,593,886 B2 | 7/2003 | Schantz |
| 6,606,051 B1 | 8/2003 | Fullerton et al. |
| 6,611,234 B2 | 8/2003 | Fullerton et al. |
| 6,614,384 B2 | 9/2003 | Hall et al. |
| 6,621,462 B2 | 9/2003 | Barnes |
| 6,636,566 B1 | 10/2003 | Roberts et al. |
| 6,636,567 B1 | 10/2003 | Roberts et al. |
| 6,636,573 B2 | 10/2003 | Richards et al. |
| 6,642,903 B2 | 11/2003 | Schantz |
| 6,661,342 B2 | 12/2003 | Hall et al. |
| 6,667,724 B2 | 12/2003 | Barnes et al. |
| 6,670,909 B2 | 12/2003 | Kim |
| 6,671,310 B1 | 12/2003 | Richards et al. |
| 6,674,396 B2 | 1/2004 | Richards et al. |
| 6,677,796 B2 | 1/2004 | Brethour et al. |
| 6,700,538 B1 | 3/2004 | Richards |
| 6,710,736 B2 | 3/2004 | Fullerton et al. |
| 6,717,992 B2 | 4/2004 | Cowie et al. |
| 6,748,040 B1 | 6/2004 | Johnson et al. |
| 6,750,757 B1 | 6/2004 | Gabig, Jr. et al. |
| 6,759,948 B2 | 7/2004 | Grisham et al. |
| 6,760,387 B2 | 7/2004 | Langford et al. |
| 6,762,712 B2 | 7/2004 | Kim |
| 6,763,057 B1 | 7/2004 | Fullerton et al. |
| 6,763,282 B2 | 7/2004 | Glenn et al. |
| 6,774,846 B2 | 8/2004 | Fullerton et al. |
| 6,774,859 B2 | 8/2004 | Schantz et al. |
| 6,778,603 B1 | 8/2004 | Fullerton et al. |
| 6,781,530 B2 | 8/2004 | Moore |
| 6,782,048 B2 | 8/2004 | Santhoff |
| 6,788,730 B1 | 9/2004 | Richards et al. |
| 6,822,604 B2 | 11/2004 | Hall et al. |
| 6,823,022 B1 | 11/2004 | Fullerton et al. |
| 6,836,223 B2 | 12/2004 | Moore |
| 6,836,226 B2 | 12/2004 | Moore |
| 6,845,253 B1 | 1/2005 | Schantz |
| 6,847,675 B2 | 1/2005 | Fullerton et al. |
| 6,859,488 B2 | 2/2005 | Azenkot et al. |
| 6,879,878 B2 | 4/2005 | Glenn et al. |
| 6,882,301 B2 | 4/2005 | Fullerton |
| 6,895,034 B2 | 5/2005 | Nunally et al. |
| 6,900,732 B2 | 5/2005 | Richards |
| 6,906,625 B1 | 6/2005 | Taylor et al. |
| 6,907,244 B2 | 6/2005 | Santhoff et al. |
| 6,912,240 B2 | 6/2005 | Kumar et al. |
| 6,914,949 B2 | 7/2005 | Richards et al. |
| 6,917,284 B2 | 7/2005 | Grisham et al. |
| 6,919,838 B2 | 7/2005 | Santhoff |
| 6,922,166 B2 | 7/2005 | Richards et al. |
| 6,922,177 B2 | 7/2005 | Barnes et al. |
| 6,925,109 B2 | 8/2005 | Richards et al. |
| 6,933,882 B2 | 8/2005 | Fullerton |
| 6,937,639 B2 | 8/2005 | Pendergrass et al. |
| 6,937,663 B2 | 8/2005 | Jett et al. |
| 6,937,667 B1 | 8/2005 | Fullerton et al. |
| 6,937,674 B2 | 8/2005 | Santhoff et al. |
| 6,947,492 B2 | 9/2005 | Santhoff et al. |
| 6,950,485 B2 | 9/2005 | Richards et al. |
| 6,954,480 B2 | 10/2005 | Richards et al. |
| 6,959,031 B2 | 10/2005 | Haynes et al. |
| 6,959,032 B1 | 10/2005 | Richards et al. |
| 6,963,727 B2 | 11/2005 | Shreve |
| 6,980,613 B2 | 12/2005 | Krivokapic |
| 6,989,751 B2 | 1/2006 | Richards |
| 7,015,793 B2 | 3/2006 | Gabig, Jr. et al. |
| 7,020,224 B2 | 3/2006 | Krivokapic |
| 7,027,425 B1 | 4/2006 | Fullerton et al. |
| 7,027,483 B2 | 4/2006 | Santhoff et al. |
| 7,027,493 B2 | 4/2006 | Richards |
| 7,030,806 B2 | 4/2006 | Fullerton |
| 7,042,417 B2 | 5/2006 | Santhoff et al. |
| 7,046,187 B2 | 5/2006 | Fullerton et al. |
| 7,046,618 B2 | 5/2006 | Santhoff et al. |
| 7,069,111 B2 | 6/2006 | Glenn et al. |
| 7,075,476 B2 | 7/2006 | Kim |
| 7,079,827 B2 | 7/2006 | Richards et al. |
| 7,080,295 B2 | 7/2006 | Peeters et al. |
| 7,099,367 B2 | 8/2006 | Richards et al. |
| 7,099,368 B2 | 8/2006 | Santhoff et al. |
| 7,129,886 B2 | 10/2006 | Hall et al. |
| 7,132,975 B2 | 11/2006 | Fullerton et al. |
| 7,145,954 B1 | 12/2006 | Pendergrass et al. |
| 7,148,791 B2 | 12/2006 | Grisham et al. |
| 7,151,490 B2 | 12/2006 | Richards |
| 7,167,525 B2 | 1/2007 | Santhoff et al. |
| 7,170,408 B2 | 1/2007 | Taylor et al. |
| 7,184,938 B1 | 2/2007 | Lansford et al. |
| 7,190,722 B2 | 3/2007 | Lakkis et al. |
| 7,190,729 B2 | 3/2007 | Siwiak |
| 7,206,334 B2 | 4/2007 | Siwiak |
| 7,209,724 B2 | 4/2007 | Richards et al. |
| 7,230,980 B2 | 6/2007 | Langford et al. |
| 7,239,277 B2 | 7/2007 | Fullerton et al. |
| RE39,759 E | 8/2007 | Fullerton |
| 7,256,727 B2 | 8/2007 | Fullerton et al. |
| 7,271,779 B2 | 9/2007 | Hertel |
| 7,366,258 B2 | 4/2008 | Kolze et al. |
| 2003/0067963 A1* | 4/2003 | Miller et al. ............... 375/130 |
| 2003/0161388 A1 | 8/2003 | Schilling |
| 2005/0013386 A1* | 1/2005 | Ojard ............... 375/316 |
| 2005/0278609 A1 | 12/2005 | Kim et al. |
| 2007/0055790 A1 | 3/2007 | Yao et al. |
| 2008/0116941 A1* | 5/2008 | Ekbal et al. ............... 327/58 |

FOREIGN PATENT DOCUMENTS

| | | |
|---|---|---|
| KR | 20050116995 A | 12/2005 |

OTHER PUBLICATIONS

Writtens Opinion—PCT/US07/079603—International Search Authority, European Patent Office—Jul. 17, 2008.
Taiwan Search Report—TW097101822—TIPO—Jun. 29, 2011.

* cited by examiner

INTERFERENCE MITIGATION FOR IMPULSE-BASED COMMUNICATION

BACKGROUND

1. Field

This application relates generally to wireless communication and more specifically, but not exclusively, to mitigating interference for pulse-based wireless communication.

2. Background

In a wireless communication system a transmitting device may send data to a receiving device by encoding the data and generating radio frequency ("RF") signals within a given frequency band, whereby the RF signals carry the encoded data over an appropriate communication medium to the receiving device. The receiving device may then process any radio frequency signals it receives within the designated frequency band in an attempt to recover the transmitted data.

In practice, the accuracy with which a receiving device extracts data from a received signal may be adversely affected by interference in the associated communication medium. For example, an interfering device in the vicinity of the receiving device may generate signals in the RF band that is used by the transmitting and receiving devices. In this case, the receiving device may receive signals that are, in affect, a combination of the signals transmitted by the transmitting and interfering devices. Consequently, a receiving device may need to implement an interference mitigation scheme to effectively extract the data transmitted by the transmitting device from any received signals.

SUMMARY

A summary of sample aspects of the disclosure follows. It should be understood that any reference to the term aspects herein may refer to one or more aspects of the disclosure.

The disclosure relates in some aspects to pulse-based communication. Here, a series of pulses may be used to convey information from a transmitting device to a receiving device via a wireless communication medium. In some aspects the communication may comprise ultra-wideband communication that uses relatively narrow pulses (i.e., narrow in time) to convey the information.

In practice, interference from other impulse-based communication devices or strong narrowband interferers, as well as harmonic signals generated by those interferers, and other interferers (e.g., wide-band interferers that are not impulse-based), may effectively alter the transmitted pulse energy as it travels through the communication medium. In some cases this interference may be significant enough to cause decoding failure at the receiving device.

The disclosure relates in some aspects to using erasures to mitigate interference. Here, the erasures may comprise decision metrics for a decoding process (e.g., convolutional code-based operation). For example, a receiver may mark any outlier pulses that it receives as erasures so that these pulses will be ignored during the decoding process.

The disclosure relates in some aspects to defining thresholds and designating erasures based on one or more characteristics of received pulses. For example, in some aspects at least one characteristic of a received pulse is compared with at least one threshold to determine whether to mark that pulse as an erasure. In addition, in some aspects the at least one threshold is defined based on at least one characteristic of a plurality of previously received pulses.

BRIEF DESCRIPTION OF THE DRAWINGS

These and other features, aspects, and advantages of the disclosure will be more fully understood when considered with respect to the following detailed description, the appended claims, and the accompanying drawings, wherein:

FIG. 7, including

Figure 1:
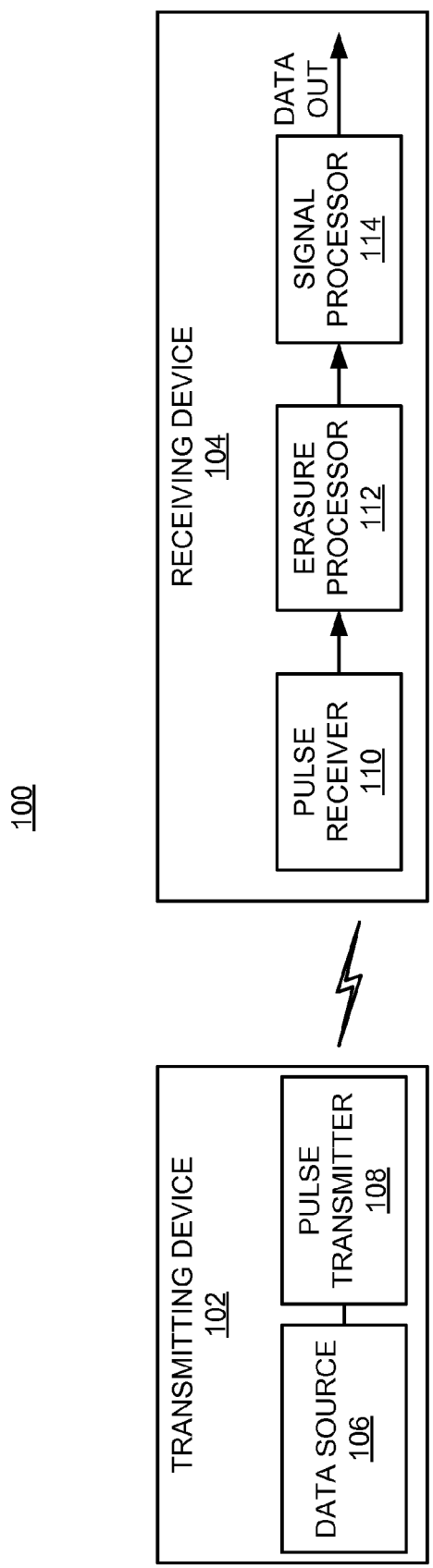
FIG. 1 is a simplified block diagram of several sample aspects of a communication system adapted to provide erasure-based interference mitigation.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim. As an example of the above, in some aspects a method of erasure detection may involve comparing a characteristic of a received pulse signal with a threshold and designating the pulse signal as an erasure based on the comparison. In addition, in some aspects such a method of erasure detection may involve defining the threshold based on characteristics of previously received pulse signals.

FIG. 1 illustrates sample aspects of a wireless communication system 100 where a wireless transmitting device 102 transmits data to a wireless receiving device 104. Here, the designations "transmitting device" and "receiving device"

are used to illustrate an example of data flow from one device to another. It should be appreciated that each of the devices 102 and 104 may be capable of both transmitting and receiving data.

In some aspects the system 100 comprises a pulse-based communication (e.g., impulse radio) system whereby the device 102 generates a series of pulses to convey data to the device 104. For example, the system 100 may utilize ultra-wideband communication technology whereby information is conveyed using relatively narrow pulses. In some implementations such pulses may have a pulse width on the order of a few nanoseconds or less (e.g., on the order of 100 picoseconds or less).

FIG. 1 illustrates several components of the devices 102 and 104 that may be used to facilitate pulse-based communication. A data source 106 of the device 102 provides (e.g., generates) data to be transmitted to the device 104. The data source 106 may provide functionality relating to, for example, generating a stream of encoded data. A pulse transmitter 108 generates a series of pulses based on the data from the data source 106. In some implementations the pulses may be generated at a relatively low duty cycle to facilitate relatively low-power operation and to support concurrent transmission of multiple pulse streams over a given channel (e.g., over a given frequency band). As an example, in some implementations the transmitted pulses may have a pulse repetition interval on the order of 100 nanoseconds to 10 microseconds. It should be appreciated that the above examples are merely representative and that a given pulse-based system may employ different pulse widths and/or pulse repetition intervals.

The device 104 includes components for receiving the transmitted pulses and processing the received pulses to extract the data carried by the pulses. For example, as will be discussed in more detail below a pulse receiver 110 may monitor a designated communication channel to receive the transmitted pulses. In accordance with the teachings herein, an erasure processor 112 may then process the received pulse signals to determine whether to mark one or more of the signals as an erasure. The signal processor 114 processes the received pulse signals along with any erasure indications provided by the erasure processor 112 to reconstruct the original data provided by the device 102 from the received pulse signals. As will be discussed in more detail below, the signal processor 114 may thus perform, for example, decoding and decision operations to recover the original data.

A communication system as taught herein may employ any suitable number of wireless devices that may communicate in any suitable manner. For example, in some implementations the wireless devices (e.g., devices 102 and 104) may communicate in a peer-to-peer fashion. In some implementations the wireless devices may support one or more of unicast, multicast, and broadcast communication. In some implementations the wireless devices may communicate through the use of a central controller.

Figure 2:
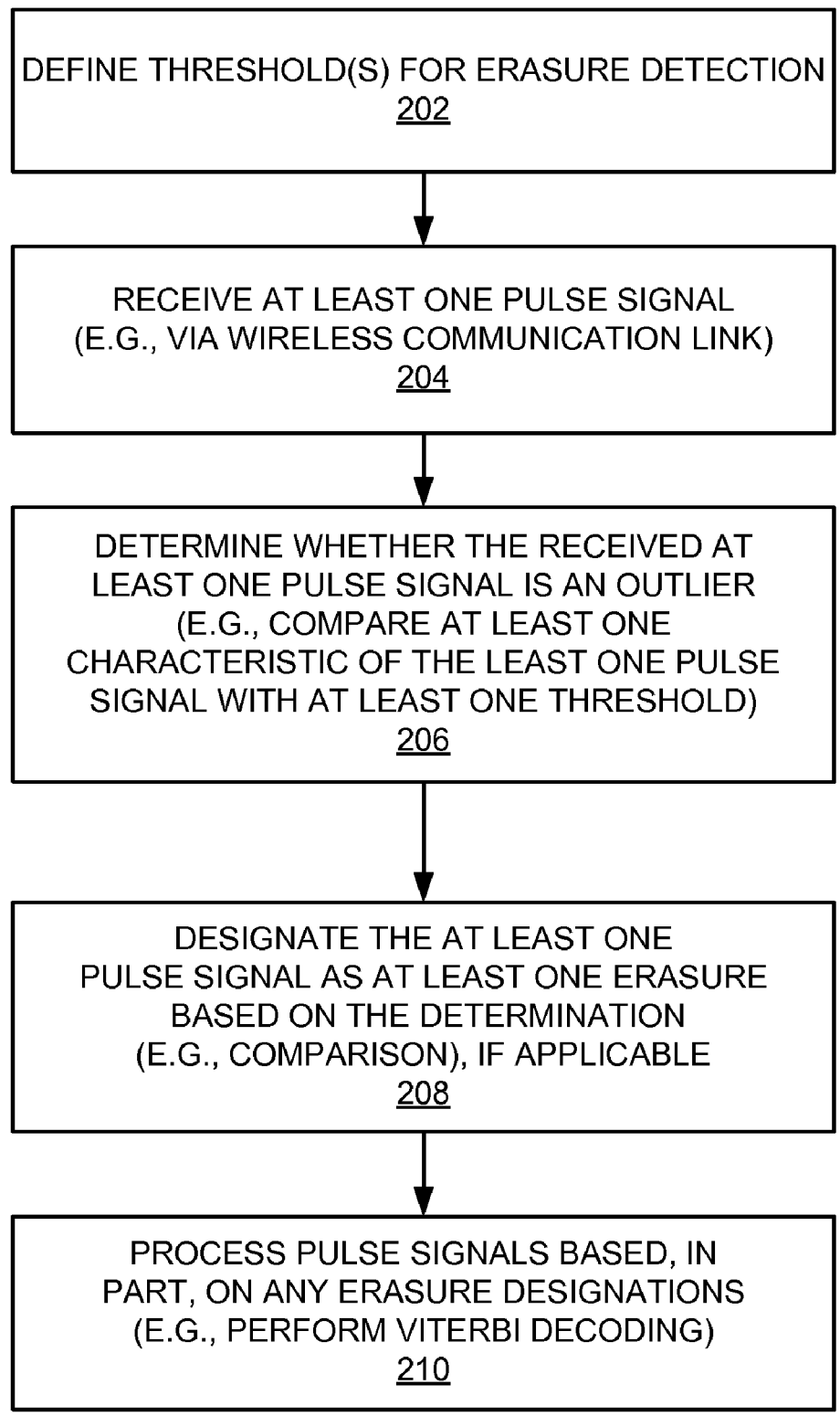
FIG. 2 is a flowchart of several sample aspects of operations that may be performed to provide erasure-based interference mitigation.
Figure 3:
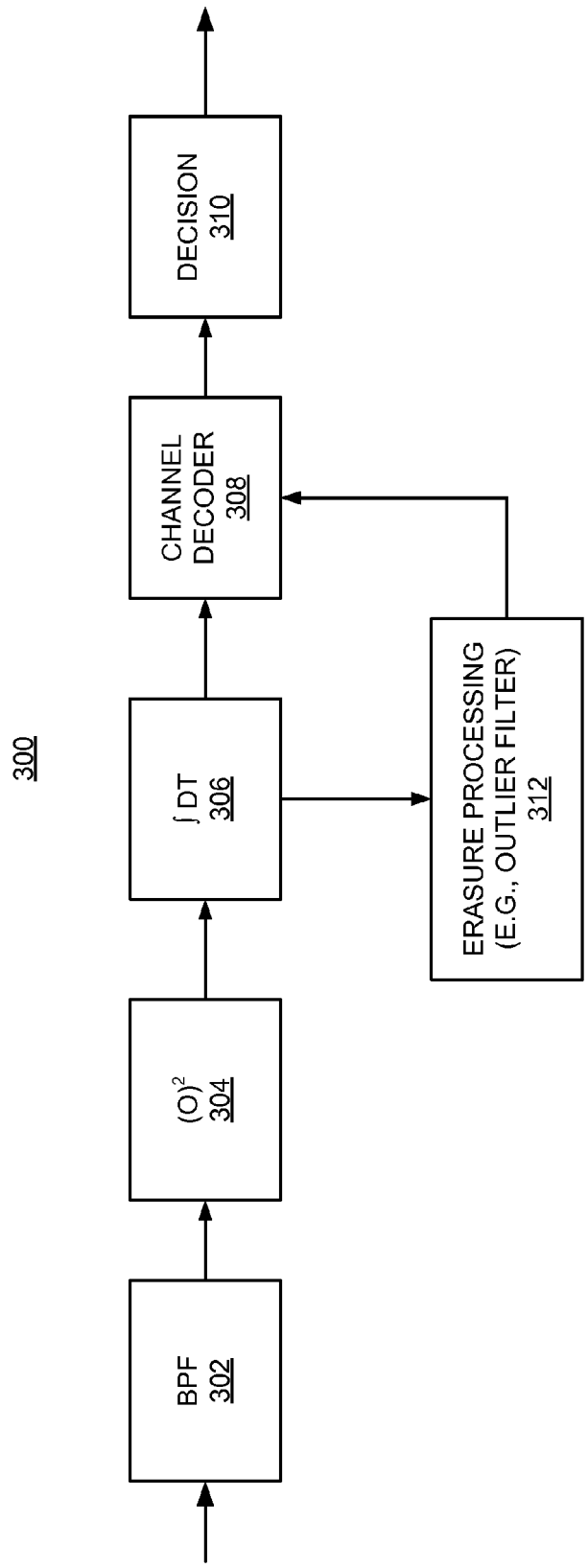
FIG. 3 is a simplified block diagram of several sample aspects of a receiver.

Sample operations of a receiving device such as the device 104 will be described in more detail in conjunction with the flowchart of FIG. 2 and sample components of a receive path 300 (e.g., of the device 104) as illustrated in FIG. 3. For convenience, the operations of FIG. 2 (or any other operations discussed or taught herein) may be described as being performed by specific components (e.g., components of the system 100 and/or the receive path 300). It should be appreciated, however, that these operations may be performed by other types of components and may be performed using a different number of components. It also should be appreciated that one or more of the operations described herein may not be employed in a given implementation.

As represented by block 202 of FIG. 2, the erasure processor 112 may define one or more thresholds for the erasure detection operations. An erasure detection threshold may be based on various criteria. For example, as discussed below in conjunction with FIG. 5, in some implementations a threshold may be based on one or more characteristics of one or more received pulses. For example, in some implementations a threshold level may be based on energy levels associated with previous packets that were successfully received. In some implementations such a threshold may be dynamically adapted over time, while in other implementations a static (e.g., predefined) threshold may be used. As an example of the former case, a threshold may be repeatedly adapted so that it corresponds to a received signal strength associated with recently received pulse signals. In this way, a threshold may be automatically adjusted to compensate for changing conditions (e.g., changes in the relative distance between the devices 102 and 104).

As represented by block 204 of FIG. 2, at some point in time the pulse receiver 110 receives one or more pulse signals. As mentioned above, the pulse receiver 110 may be configured to monitor a wireless communication link (e.g., an ultra-wideband communication channel) for pulse energy.

Referring to FIG. 3, in some implementations a non-coherent receiver may detect pulses by filtering received signal energy, squaring the filtered signal energy, and integrating the squared signal energy. To this end, the pulse receiver 110 may comprise a bandpass filter ("BPF") 302 (e.g., including an amplification component), a squaring circuit 304, and an integrator 306. In this way, for each received pulse, the integrator 306 may provide output signal representative of a level of energy associated with that pulse. Upon determination of this level of energy, the integrator 306 may then be reset to perform a similar measurement for each subsequently received pulse.

As represented by block 206 of FIG. 2, the erasure processor 112 (e.g., an erasure processing component 312 of FIG. 3) may determine whether at least one receive pulse signal should be marked as an erasure. For example, in some implementations the component 312 may comprise an outlier filter that may determine whether one or more pulses is an outlier (e.g., has a characteristic that lies outside a designated threshold or range). In some aspects, the outlier filter 312 may provide any suitable functionality that facilitates determining whether one or more characteristics of a given pulse signal substantially deviates from an expected value of the one or more characteristics. For example, in FIG. 3 the outlier filter 312 may make a determination based on energy levels provided by the integrator 306. In some implementations the outlier filter 312 may provide functionality relating to, for example, providing an average, a windowed mean, a weighted mean, a median, an infinite impulse response, a finite impulse response, or some other suitable function of one or more received pulse signals. As will be described in more detail in conjunction with FIG. 6, in some implementations the erasure processor 112 may compare at least one characteristic of the at least one pulse signal with at least one threshold.

As represented by block 208, as necessary, the erasure processor 112 will designate the at least one pulse signal as at least one erasure based on the determination of block 206. For example, if the energy or amplitude of the received pulse exceeds a designated threshold, the erasure processor 112 (e.g., the outlier filter 312) may generate an erasure decision indication associated with the received pulse.

As represented by block 210, the signal processor 114 may then process the received pulse signals to extract the associated data, taking into consideration any erasure decisions generated at block 208. For example, in FIG. 3 a channel decoder component 308 and decision component 310 of the processor 114 may compute decoder confidence metrics (e.g., Viterbi decision metrics for a convolutional code) that are used to determine one or more data values represented by a given pulse or pulses. Thus, the erasure information provided by the erasure processing component 312 may comprise decision metrics for the convolutional code. Accordingly, in conjunction with these operations the signal processor 114 may ignore any pulses marked as an erasure. Here, it should be appreciated that through the use of an appropriate erasure code, the system 100 may maintain a high level of performance even when a given percentage of the pulses are marked as erasures.

Consequently, a system that uses an erasure scheme as taught herein may avoid at least some of the interference-induced pulse distortion problems that may otherwise adversely affect the decoding process. As an example, in a binary pulse position modulation scheme, a receiver decision metric may be based on the difference between the energy detected at each pulse position. For example, if E1 and E0 represent the energy detected at the positions corresponding to a "1" and a "0" respectively, the decoder/decision components may use E1-E0 to compute the decoder confidence metrics. However, if there is significant interference during these positions, the value E1-E0 may not reflect an accurate confidence level (e.g., interference may cause a "bit flip"). Similarly, in an on/off keying modulation scheme, interference may result in detection of a pulse at a time that a pulse was not transmitted (e.g., corresponding to a "0" value). In practice, interference as described above may significantly degrade the performance of the decision/decoder components.

In contrast, in accordance with the teachings herein such degradation may be mitigated at least to some extent by marking pulses with significant interference as erasures. As mentioned above, one way of marking erasures in impulse-based communication is to determine whether E1 and/or E0 is an outlier. In the example of FIG. 3, the outlier filter 312 may track the detected energy values E1 and E0 and compare these values with one or more outlier thresholds to determine whether these energy levels are outside a specified range. For example, the outlier filter 312 may mark an erasure if either E1 or E0 is greater than or equal to than a threshold, or if both E1 and E0 are greater than or equal to a threshold. Moreover, as mentioned above the erasure processor 112 (FIG. 1) may dynamically adapt the range outside of which the received pulses are marked as erasures. In this way, such an erasure-based interference mitigation scheme may effectively adapt for changing conditions (e.g., changes in received signal levels) in the communication system 100.

With the above in mind, additional details relating to components that may be used and/or operations that may be performed in conjunction with the teachings herein will be discussed in conjunction with the apparatus 400 (e.g., similar to the erasure processor 112) of FIG. 4 and the flowcharts of FIGS. 5, 6, and 8. Again, the components and operations described below are provided for illustration purposes, and it should be understood that the teachings herein may be implemented using other components and operations.

Figure 4:
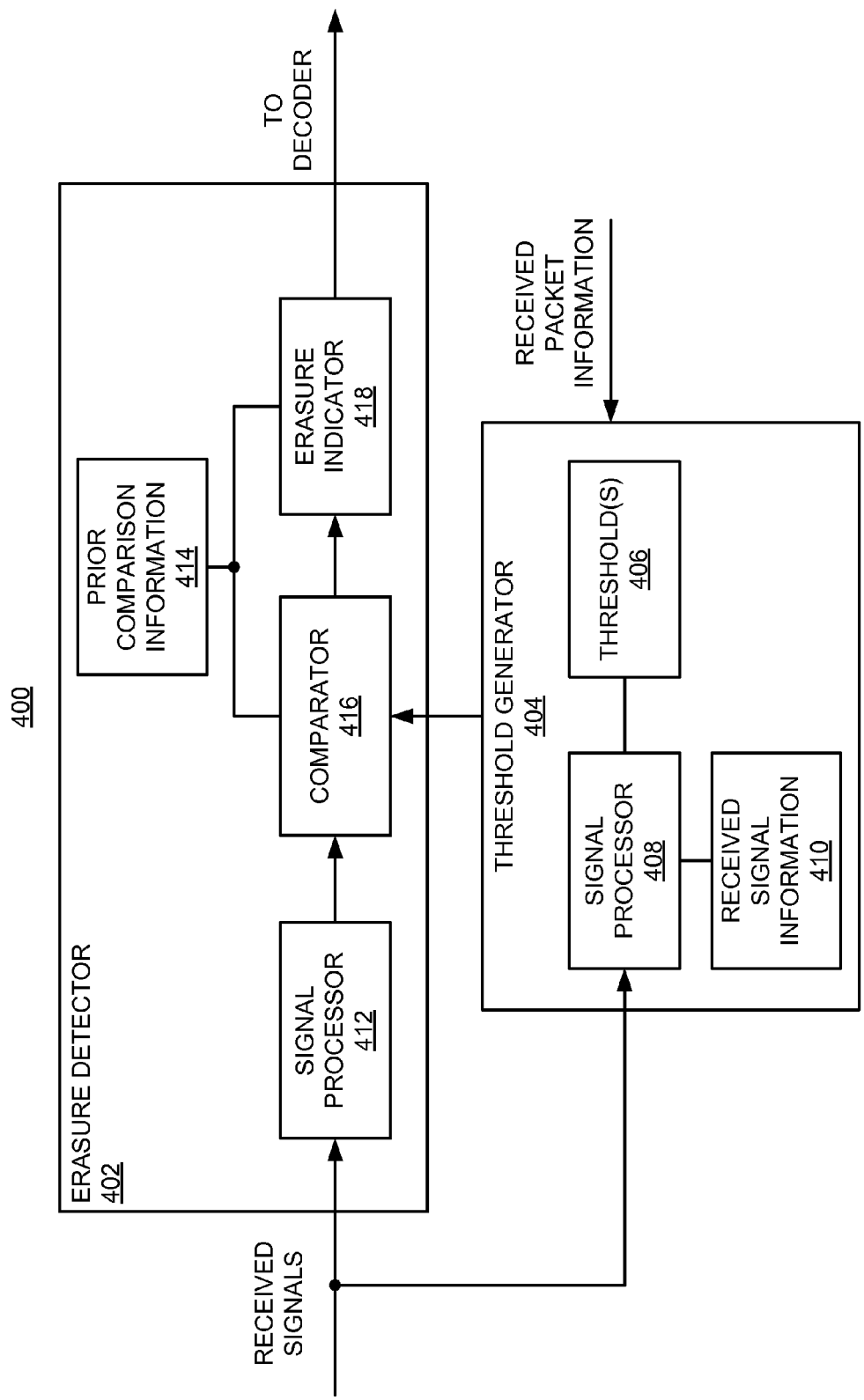
FIG. 4 is a simplified block diagram of several sample aspects of erasure detection-related components.

Referring initially to FIG. 4, the apparatus 400 comprises an erasure detector 402 and a threshold generator 404. The erasure detector 402 processes received signals (e.g., pulses) and provides indications as to whether the received signals are marked as an erasure for a decoder or some other suitable component (not shown in FIG. 4). The threshold generator 404 processes received signals and generates one or more thresholds (hereafter referred to as "the threshold 406," for convenience) that are used by the erasure detector 402.

Figure 5:
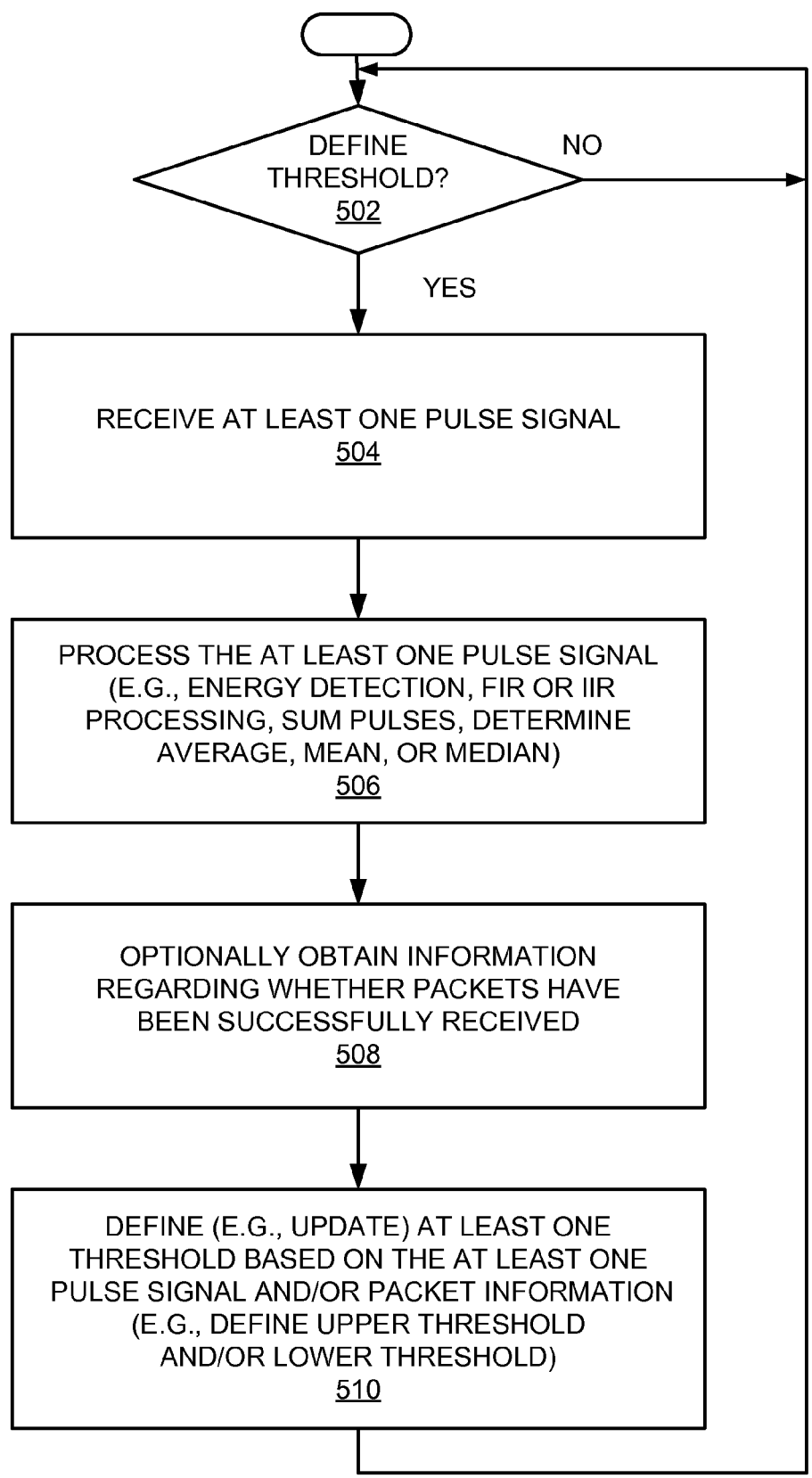
FIG. 5 is a flowchart of several sample aspects of operations that may be performed to define one or more thresholds for erasure detection.

The flowchart of FIG. 5 illustrates several sample operations that may be performed by the threshold generator 404. As represented by block 502, the threshold generator 404 determines whether to define (e.g., update) the threshold 406. For example, in some implementations the threshold generator 404 may regularly (e.g., periodically) process received pulse signals to ensure that the current threshold accurately reflects the normal characteristics (e.g., one or more of signal strength, amplitude, phase, frequency, or bandwidth) of the pulse signals that are currently being received.

Accordingly, at block 504 one or more pulse signals received by the apparatus 400 (e.g., received by the pulse receiver 110) are provided to the threshold generator 404. In some implementations, the threshold generator 404 acquires several pulse signals over a period of time as will be discussed below.

At block 506 a signal processor 408 processes a received pulse signal to derived one or more characteristics relating to the pulse signal. For example, in some implementations the signal processor 408 may detect an energy level of the received pulse signal as described above in conjunction with FIG. 3. In some implementations the signal processor 408 may detect an amplitude level of the received pulse signal or some other indication relating to the received signal strength of the received pulse signal.

The signal processor 408 may perform various operations to derive a desired characteristic relating to the received pulse signal. In some implementations the signal processor 408 may generate an infinite impulse response filter value of at least one characteristic of the received pulse signal. In some implementations the signal processor 408 may generate a finite impulse response filter value of at least one characteristic of the received pulse signal.

In some implementations the signal processor 408 may acquire information 410 associated with a plurality of received pulse signals over time to generate the threshold 406. For example, the signal processor 408 may sum signal information associated with several pulses or pulse positions. In some implementations the signal processor 408 may determine an average value, a mean value (e.g., a windowed mean or a weighted mean), or a median value of at least one characteristic of a plurality of received pulse signals.

At block 508, the threshold generator 404 may optionally define the threshold 406 based on information relating to one or more received packets. For example, in some implementations the threshold generator 404 may generate the threshold 406 based on at least one characteristic (e.g., one or more of signal strength, amplitude, phase, frequency, or bandwidth) of pulses that are associated with successfully received packets. In other words, the threshold generator 404 may associate received pulse information with information relating to packets that are derived from those pulses. To this end, the threshold generator 404 may receive an indication from another component (e.g., the signal processor 114) that indicates whether the associated packet was successfully received. In this way, the threshold generator 404 may generate the threshold 406 (at block 510 discussed below) based on reliable pulse information (e.g., information associated with successfully received packets). Conversely, the threshold generator 404 may discard less reliable pulse information (e.g., information associated with packets that were not successfully received).

At block 510, the threshold generator 404 defines (e.g., generates) the threshold 406 based on one or more of the operations described above. In some cases, this may involve updating the threshold 406 based on newly received pulse signal information. For example, in the event the signal strength of received pulses has increased, the threshold 406 may be increased. As indicated by the arrow returning to block 502, the operations of FIG. 5 may be repeated, as desired, to dynamically update the threshold 406.

As discussed above the threshold 406 may be based on at least one characteristic of at least one previously received pulse signal. For example, the threshold 406 may relate to one or more of energy level, amplitude, received signal strength, phase, frequency, bandwidth, or some other suitable characteristic. In addition, a threshold may comprise or otherwise relate to some function (e.g., an average, mean, median, and so on) of a characteristic.

The threshold 406 may take various forms. For example, in some implementations the threshold 406 may comprise an upper threshold associated with an upper bound (e.g., including a tolerance margin) for a characteristic of a received pulse signal. In some implementations the threshold 406 may comprise a lower threshold associated with a lower bound (e.g., including a tolerance margin) for a characteristic of a received pulse signal. In some implementations the threshold 406 may comprise both upper and lower bounds. For example, the threshold 406 may define a range of acceptable values for pulse-related information.

Figure 6:
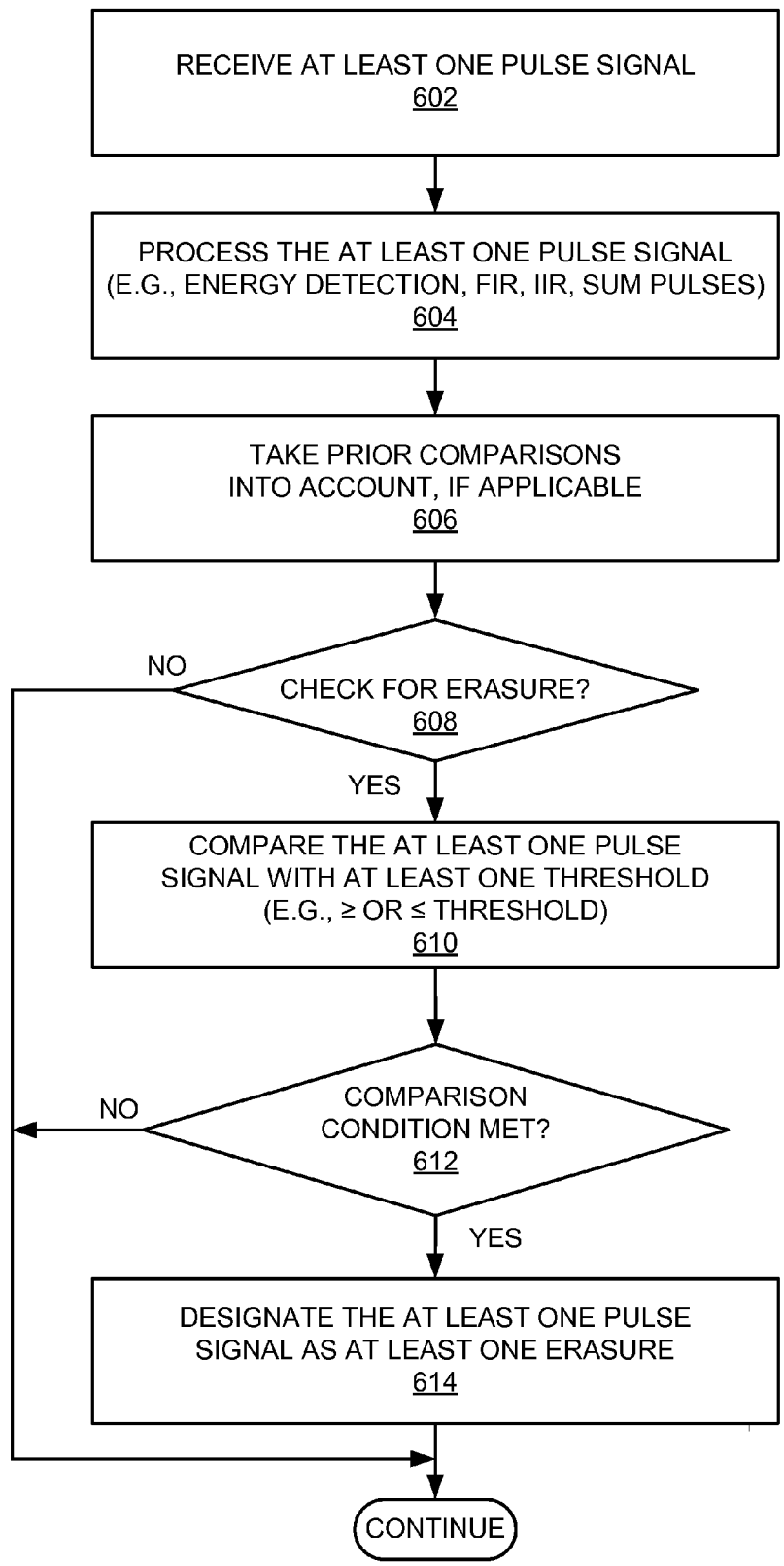
FIG. 6 is a flowchart of several sample aspects of operations that may be performed to designate at least one pulse as at least one erasure.

Referring to FIG. 6, several sample operations of the erasure detector 402 will now be described. At block 602, one or more pulse signals received by the apparatus 400 (e.g., received by the pulse receiver 110) are provided to the erasure detector 402. In some aspects, an erasure decision may be based on receipt of information associated with a single pulse signal, multiple pulse signals, energy associated with an expected pulse position (e.g., in time), energy associated with multiple pulse positions, or some other suitable signal or signals. For convenience, the discussion that follows will refer to determining whether to mark a received pulse as an erasure. As will be discussed in more detail below, however, it should be appreciated that these operations may relate to designating one or more instances of signal information (e.g., pulses) as one or more erasures.

At block 604 a signal processor 412 processes a received pulse signal to derived one or more characteristics relating to the pulse signal. For example, in some implementations the signal processor 412 may detect an energy level of the received pulse signal as described above in conjunction with FIG. 3, an amplitude level of the received signal, or some other indication relating to the strength of a received signal.

In a similar manner as mentioned above in conjunction with FIG. 5, the signal processor 412 may perform various operations to obtain one or more characteristics of the received pulse signal. For example, the signal processor 408 may generate an infinite/finite impulse response filter value of at least one characteristic of the received pulse signal. In some implementations the signal processor 408 may acquire a sum value, an average, a mean value (e.g., a windowed mean or a weighted mean), or a median value associated with one or more pulses or one or more pulse positions (e.g., energy detected at a designated pulse position).

As represented by block 606, in some implementations the erasure detector 402 may take prior erasure detection-related information 414 into account when determining whether to mark a current received pulse as an erasure. For example, in some implementations a decision as to whether to mark a pulse as an erasure may be based on the results of prior comparisons of received pulses with the threshold 406. Here, in the event the threshold generator 404 is acquiring information to initially define the threshold 406, the erasure detector 402 may elect to not check for erasures. Similarly, the threshold generator 404 may elect to not mark a received pulse as an erasure in the event the majority of the other pulses in a group of pulses are not designated as erasures (e.g., the other pulses do not exceed an outlier threshold). Conversely, once the threshold 406 is well defined, the erasure detector 402 may elect to always check for erasures and may mark every pulse that fails the comparison operation described below as erasure (e.g., the pulse exceeds the outlier threshold).

As represented by block 608, in the event the erasure detector 402 is not checking for erasures at this time or marking pulses as erasures, the received pulse signal may then be processed in the normal manner (e.g., decoded by the signal processor 114). At some point in time the operational flow may then proceed back to block 602 whereby the erasure detection-related operations of FIG. 6 may be performed for another pulse.

In the event the erasure detector 402 is checking for erasures at block 608, a comparator 416 may compare a characteristic of the received pulse signal with the threshold 406 (block 610). As mentioned above, this may involve determining whether the characteristic (e.g., energy level, amplitude, received signal strength, and so on) is greater than or equal to a threshold, is less than or equal to a threshold, or is within a range (i.e., inclusively or exclusively) defined by two threshold values. In addition, as mentioned above in conjunction with block 606, information relating to a current comparison operation may be added to the prior comparison information 414 to be used during subsequent comparison operations.

As represented by block 612, in the event the comparison test at block 610 is not met (e.g., a received energy level does not exceed the threshold 406), the received pulse signal may be processed in the normal manner (e.g., decoded by the signal processor 114). The operational flow may then proceed back to block 602 at some point whereby the erasure detection-related operations of FIG. 6 may be performed for another pulse.

If the comparison test is met at block 612, (e.g., the received pulse is an outlier) an erasure indicator 418 may designate the pulse as erasure (block 614). As mentioned above, the erasure indicator 418 may then provide an erasure indication to a decoder or some other suitable component. The operational flow may then proceed back to block 602 at some point whereby the erasure detection-related operations of FIG. 6 may be performed for another pulse.

The process of marking at least one pulse signal as at least one erasure may take various forms. For example, in some implementations a given pulse signal may be compared to a threshold to determine whether to mark that pulse as an erasure. In some implementations any one of a set of pulse signals may be compared to a threshold to determine whether to mark the set of pulses as an erasure. In some implementations a combination of two or more pulse signals may be compared to a threshold to determine whether to mark the pulse signals as erasures. For example, the characteristics of the pulses (e.g., the energy level of each pulse) may be added together and the resulting sum compared to a threshold.

Figure 7A:
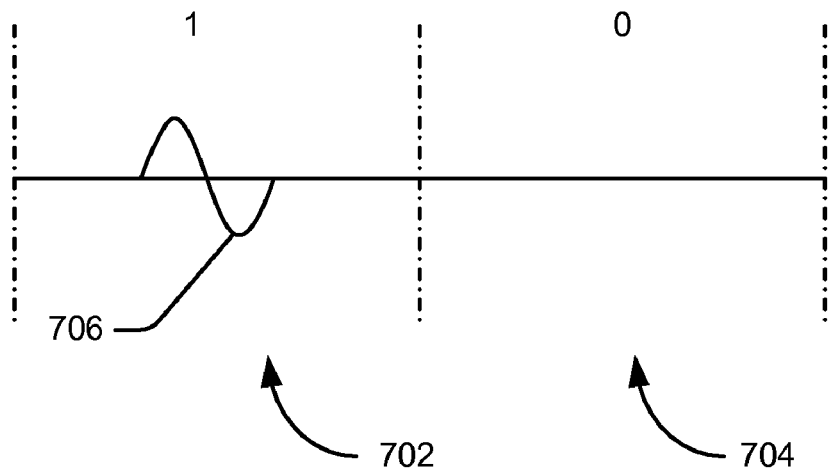
FIGS. 7A and 7B, are simplified diagrams of several sample pulse position modulation waveforms.

In some implementations erasure detection may be based on energy sensed at one or more defined periods of time. For example, a communication system may employ pulse position modulation to convey information from one wireless device to another. FIG. 7A illustrates an example pulse waveform for a binary pulse position modulation scheme. Here, a pulse appearing in a first pulse position 702 (e.g., a 100 nanosecond time period) indicates a binary "1" while a pulse appearing in a second pulse position 704 indicates a binary "0." Accordingly, the position of the pulse 706 in the example of FIG. 7A represents a binary "1."

Several sample operations relating to designating erasures for pulse position modulated signals will be described in conjunction with FIG. 8. As represented by blocks 802, 804, and 806, a receiving device (e.g., device 104) may sense signals at each of the designated pulse positions. Thus, for the case of binary pulse position modulation, signals may be sensed at pulse position 702 and then at pulse position 704.

The sensing operation may be implemented in various ways. For example, in some cases this operation may involve detecting signal energy as described above in conjunction with FIG. 3.

As represented by block 808, the receiving device (e.g., the erasure detector 402) processes any signals that are sensed at each position. Again, this operation may be similar to the operations described above (e.g., integrating received signal energy).

At block 810 the erasure detector 402 compares the signal information with a least one threshold. In some cases, this may involve combining the signal information for each pulse position (e.g., summing or subtracting the energy levels detected at each pulse position) and comparing a result with a threshold. In other cases, the operations of block 810 may involve comparing the signal information for either one or both of the pulse positions with a threshold.

Figure 7B:
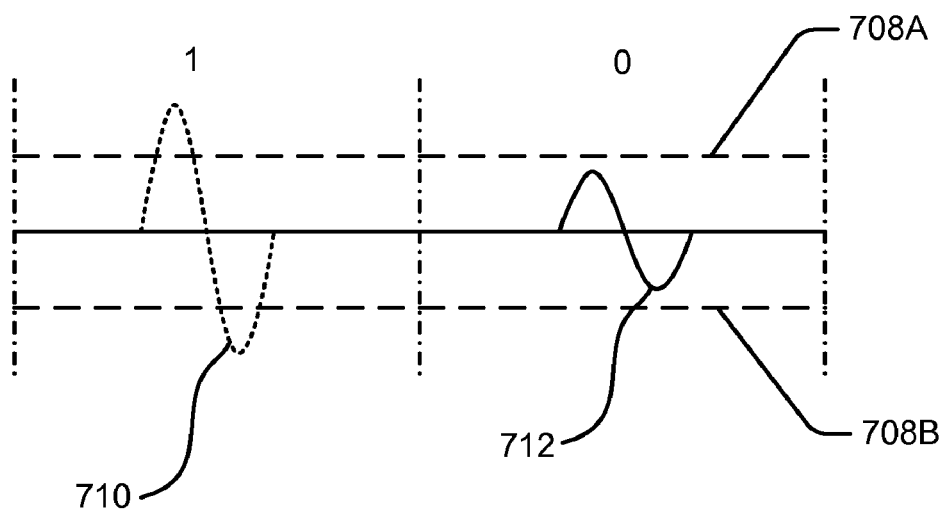

FIG. 7B illustrates an example of the latter cases. In this example, upper and lower thresholds 708A and 708B may be defined for each pulse position. Thus, a pulse signal (e.g. which may include noise) may be marked as an erasure if the pulse amplitude exceeds the upper threshold 708A or the lower threshold 708B. Thus, the outlier pulse signal 710 (e.g., resulting from an interferer) may be marked as an erasure while the pulse signal 712 may not be marked as erasure.

Figure 8:
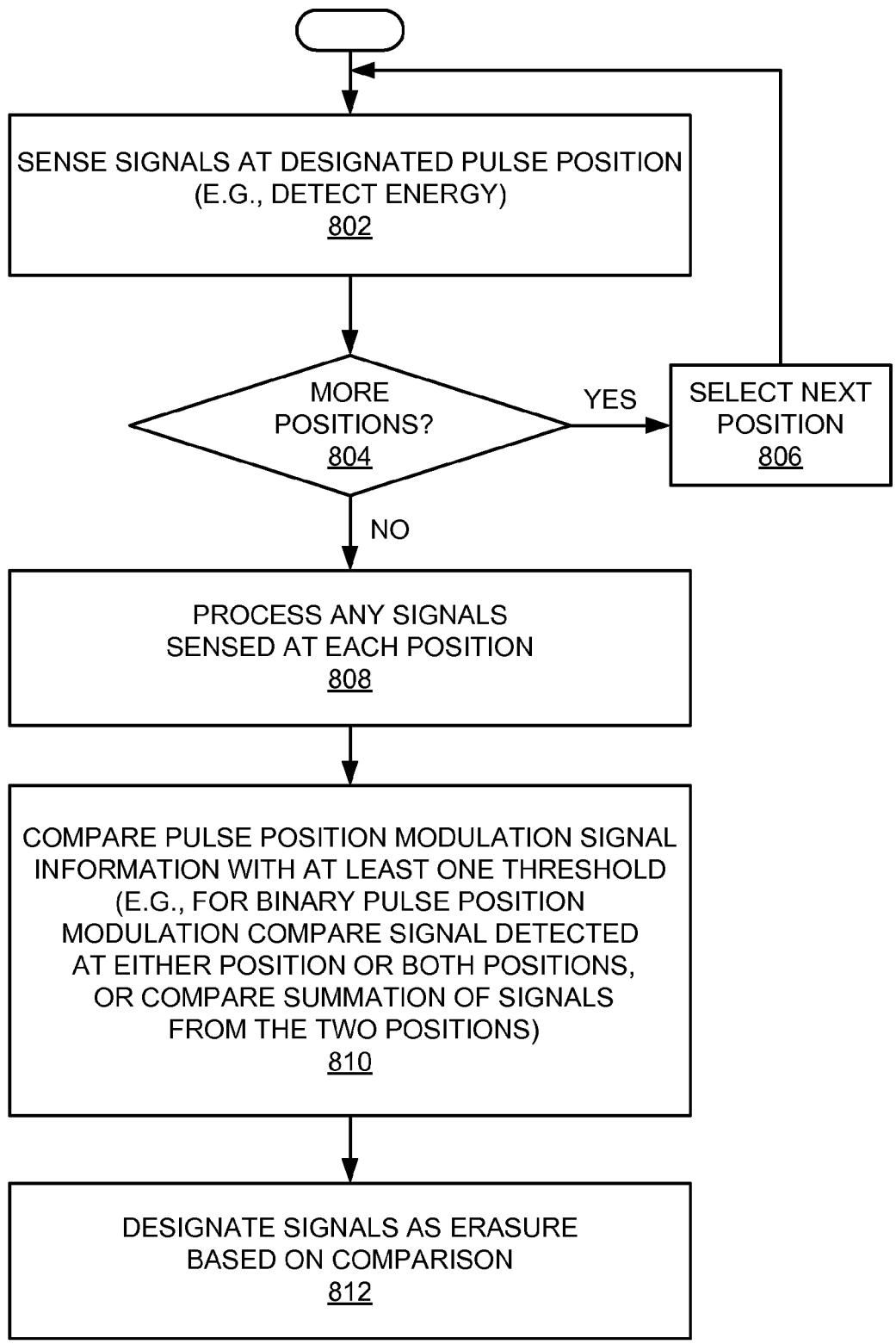
FIG. 8 is a flowchart of several sample aspects of operations that may be performed to designate at least one pulse position modulated pulse as at least one erasure.

As represented by block 812 in FIG. 8, based on the comparison at block 810, the erasure detector 402 may designate one or more pulses as one or more erasures. For example, the receiving device may designate a single pulse from one of the pulse positions as an erasure (e.g., as in the example of FIG. 7B). Conversely, in the event both of the pulses 710 and 712 are outliers, the receiving device may designate each pulse as erasure. In the event the summation of the two pulses 710 and 712 exceeds a threshold (e.g., different than the thresholds 708A and 708B), the energy associated with the two pulse positions may be designated as an erasure.

Figure 9:
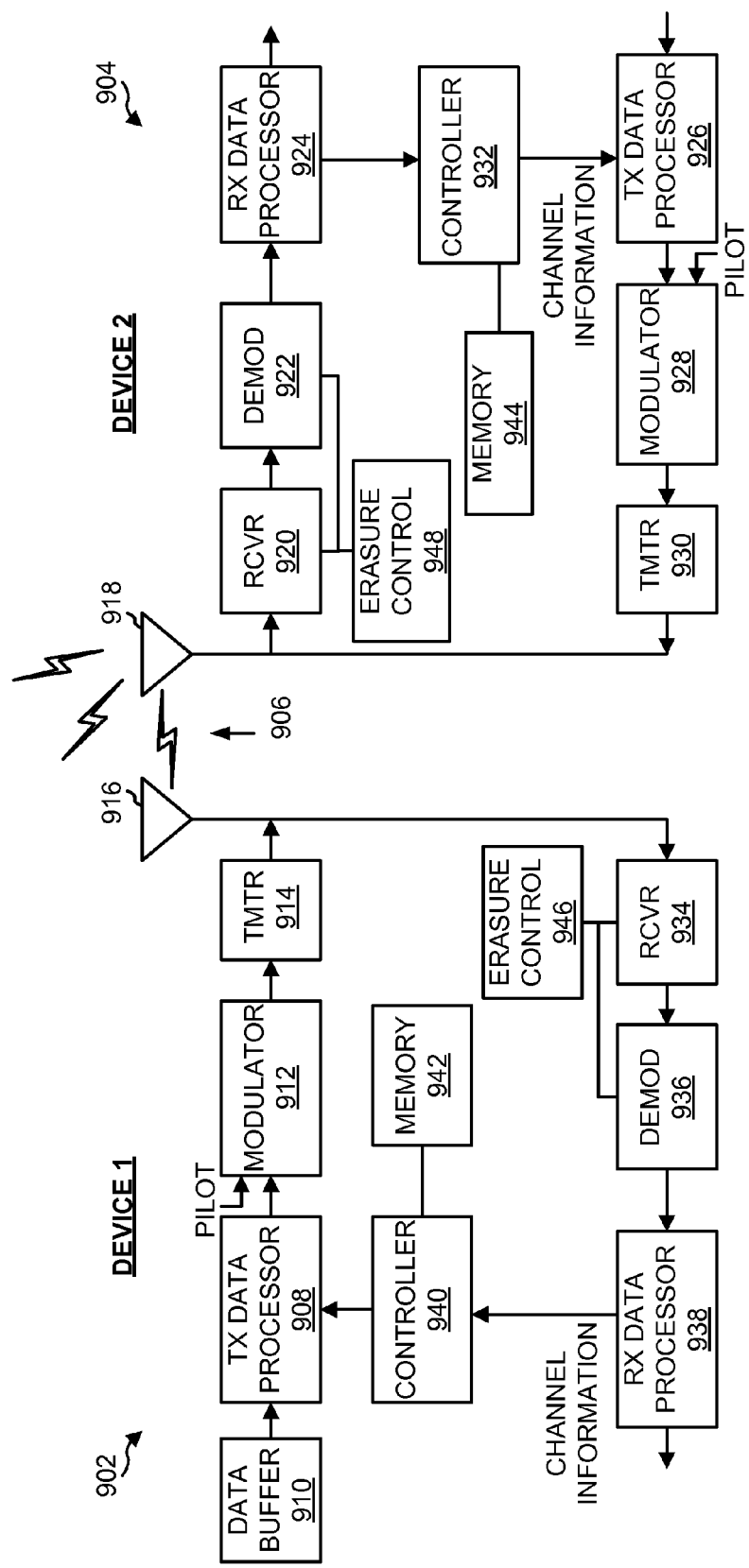
FIG. 9 is a simplified block diagram of several sample aspects of communication components.

The teachings herein may be incorporated into a device employing various components for communicating with at least one other device. FIG. 9 depicts several sample components that may be employed to facilitate communication between devices. Here, a first device 902 and a second device 904 are adapted to communicate via a wireless communication link 906 over a suitable medium.

Initially, components involved in sending information from the device 902 to the device 904 (e.g., a reverse link) will be treated. A transmit ("TX") data processor 908 receives traffic data (e.g., data packets) from a data buffer 910 or some other suitable component. The transmit data processor 908 processes (e.g., encodes, interleaves, and symbol maps) each data packet based on a selected coding and modulation scheme, and provides data symbols. In general, a data symbol is a modulation symbol for data, and a pilot symbol is a modulation symbol for a pilot (which is known a priori). A modulator 912 receives the data symbols, pilot symbols, and possibly signaling for the reverse link, and performs modulation (e.g., OFDM or some other suitable modulation) and/or other processing as specified by the system, and provides a stream of output chips. A transmitter ("TMTR") 914 processes (e.g., converts to analog, filters, amplifies, and frequency upconverts) the output chip stream and generates a modulated signal, which is then transmitted from an antenna 916.

The modulated signals transmitted by the device 902 (along with signals from other devices in communication with the device 904) are received by an antenna 918 of the device 904. A receiver ("RCVR") 920 processes (e.g., conditions and digitizes) the received signal from the antenna 918 and provides received samples. A demodulator ("DEMOD") 922 processes (e.g., demodulates and detects) the received samples and provides detected data symbols, which may be a noisy estimate of the data symbols transmitted to the device 904 by the other device(s). A receive ("RX") data processor 924 processes (e.g., symbol demaps, deinterleaves, and decodes) the detected data symbols and provides decoded data associated with each transmitting device (e.g., device 902).

Components involved in sending information from the device 904 to the device 902 (e.g., a forward link) will be now be treated. At the device 904, traffic data is processed by a transmit ("TX") data processor 926 to generate data symbols. A modulator 928 receives the data symbols, pilot symbols, and signaling for the forward link, performs modulation (e.g., OFDM or some other suitable modulation) and/or other pertinent processing, and provides an output chip stream, which is further conditioned by a transmitter ("TMTR") 930 and transmitted from the antenna 918. In some implementations signaling for the forward link may include power control commands and other information (e.g., relating to a communication channel) generated by a controller 932 for all devices (e.g. terminals) transmitting on the reverse link to the device 904.

At the device 902, the modulated signal transmitted by the device 904 is received by the antenna 916, conditioned and digitized by a receiver ("RCVR") 934, and processed by a demodulator ("DEMOD") 936 to obtain detected data symbols. A receive ("RX") data processor 938 processes the detected data symbols and provides decoded data for the device 902 and the forward link signaling. A controller 940 receives power control commands and other information to control data transmission and to control transmit power on the reverse link to the device 904.

The controllers 940 and 932 direct various operations of the device 902 and the device 904, respectively. For example, a controller may determine an appropriate filter, reporting information about the filter, and decode information using a filter. Data memories 942 and 944 may store program codes and data used by the controllers 940 and 932, respectively.

FIG. 9 also illustrates that the communication components may include one or more components that perform erasure-related operations as taught herein. For example, an erasure control component 946 may cooperate with the receiver 934 and the demodulator 936 and other components of the device 902 to receive information from another device (e.g., device 904). Similarly, an erasure control component 948 may cooperate with the receiver 920 and the demodulator 922 and other components of the device 904 to receive information from another device (e.g., device 902).

A wireless device may include various components that perform functions based on signals that are transmitted by or received at the wireless device. For example, a wireless headset may include a transducer configured to provide an audio output based on data received via the receiver. A wireless watch may include a user interface configured to provide an indication based on data received via the receiver. A wireless sensing device may include a sensor configured to provide data to be transmitted via a transmitter.

A wireless device may communicate via one or more wireless communication links that are based on or otherwise support any suitable wireless communication technology. For example, in some aspects a wireless device may associate with a network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, CDMA, TDMA, OFDM, OFDMA, WiMAX, and Wi-Fi. Similarly, a wireless device may support or otherwise use one or more of a variety of corresponding modulation or multiplexing schemes (e.g., pulse position modulation, on/off keying, or some other suitable scheme). A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., transmitter 108 and receiver 110) that may include various components (e.g., signal generators and signal processors) that facilitate communication over a wireless medium.

In some aspects a wireless device may communicate via a pulse-based (e.g., impulse-based) wireless communication link. For example, a pulse-based wireless communication link may utilize ultra-wideband pulses that have a relatively short length (e.g., on the order of a few nanoseconds or less) and a relatively wide bandwidth. In some aspects ultra-wideband pulses may have a fractional bandwidth on the order of approximately 20% or more and/or have a bandwidth on the order of approximately 500 MHz or more.

The teachings herein may be incorporated into (e.g., implemented within or performed by) a variety of apparatuses (e.g., devices). For example, one or more aspects taught herein may be incorporated into a phone (e.g., a cellular phone), a personal data assistant ("PDA"), an entertainment device (e.g., a music or video device), a headset (e.g., headphones, an earpiece, etc.), a microphone, a medical sensing device (e.g., a biometric sensor, a heart rate monitor, a pedometer, an EKG device, etc.), a user I/O device (e.g., a watch, a remote control, a light switch, a keyboard, a mouse, etc.), an environment sensing device (e.g., a tire pressure monitor), a computer, a point-of-sale device, an entertainment device, a hearing aid, a set-top box, or any other suitable device.

These devices may have different power and data requirements. In some aspects, the teachings herein may be adapted for use in low power applications (e.g., through the use of an impulse-based signaling scheme and low duty cycle modes) and may support a variety of data rates including relatively high data rates (e.g., through the use of high-bandwidth pulses).

In some aspects a wireless device may comprise an access device (e.g., a Wi-Fi access point) for a communication system. Such an access device may provide, for example, connectivity to another network (e.g., a wide area network such as the Internet or a cellular network) via a wired or wireless communication link. Accordingly, the access device may enable another device (e.g., a Wi-Fi station) to access the other network or some other functionality. In addition, it should be appreciated that one or both of the devices may be portable or, in some cases, relatively non-portable.

Figure 10:
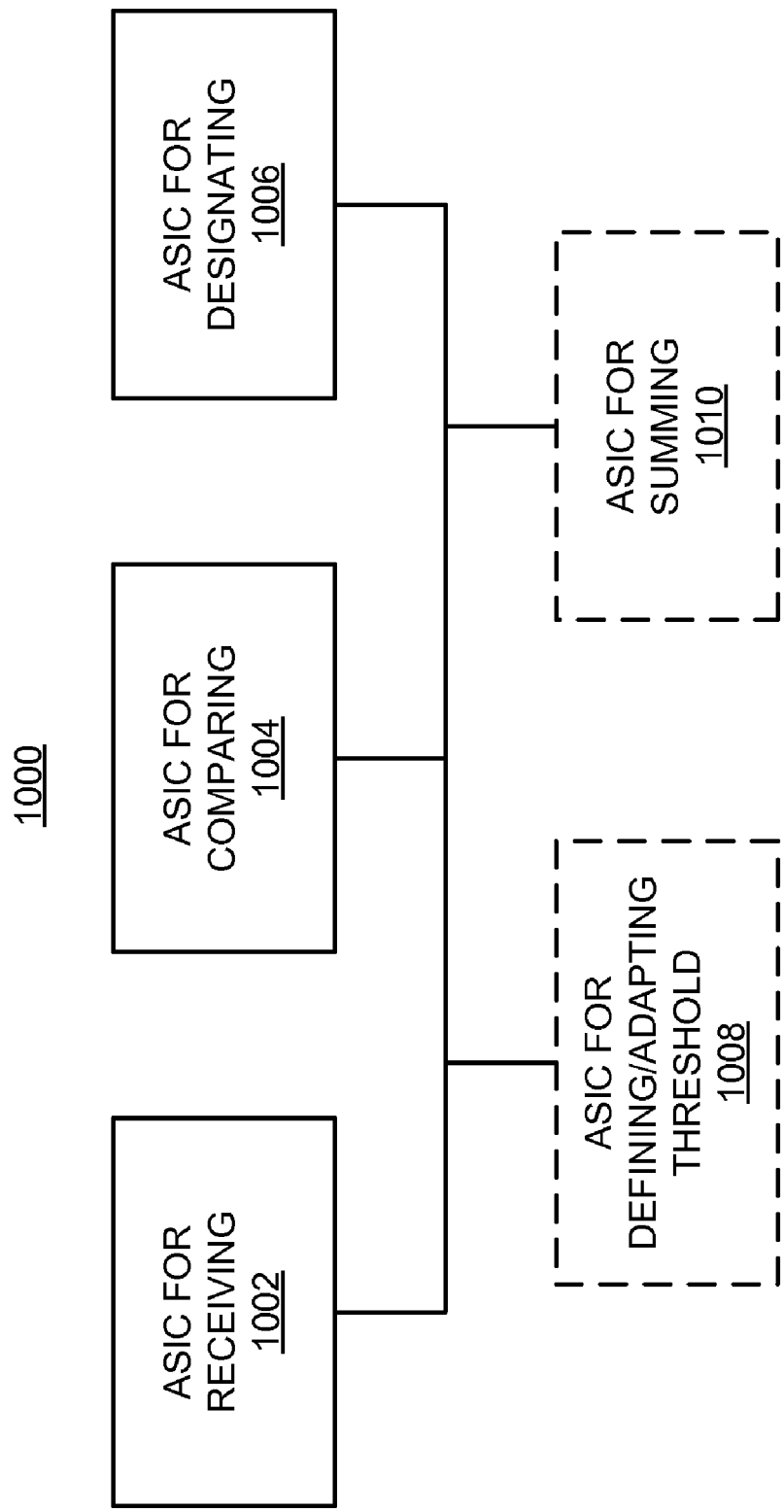
FIG. 10 is a simplified block diagram of several sample aspects of an apparatus configured to provide erasure detection as taught herein.

The components described herein may be implemented in a variety of ways. Referring to FIG. 10, an apparatus 1000 is represented as a series of interrelated functional blocks that may represent functions implemented by, for example, one or more integrated circuits (e.g., an ASIC) or may be implemented in some other manner as taught herein. As discussed herein, an integrated circuit may include a processor, software, other components, or some combination thereof.

The apparatus 1000 may include one or more modules that may perform one or more of the functions described above with regard to various figures. For example, an ASIC for receiving 1002 may correspond to, for example, a receiver as discussed herein. An ASIC for comparing 1004 may correspond to, for example, a comparator as discussed herein. An ASIC for designating 1006 may correspond to, for example, an erasure indicator as discussed herein. An ASIC for defining/adapting threshold 1008 may correspond to, for example, a threshold generator as discussed herein. An ASIC for summing 1010 may correspond to, for example, a signal processor as discussed herein.

As noted above, in some aspects these components may be implemented via appropriate processor components. These processor components may in some aspects be implemented, at least in part, using structure as taught herein. In some aspects a processor may be adapted to implement a portion or all of the functionality of one or more of these components. In some aspects one or more of the components represented by dashed boxes are optional.

As noted above, the apparatus 1000 may comprise one or more integrated circuits. For example, in some aspects a single integrated circuit may implement the functionality of one or more of the illustrated components, while in other aspects more than one integrated circuit may implement the functionality of one or more of the illustrated components.

In addition, the components and functions represented by FIG. 10 as well as other components and functions described herein, may be implemented using any suitable means. Such means also may be implemented, at least in part, using corresponding structure as taught herein. For example, the components described above in conjunction with the "ASIC for" components of FIG. 10 also may correspond to similarly designated "means for" functionality. Thus, in some aspects one or more of such means may be implemented using one or more of processor components, integrated circuits, or other suitable structure as taught herein.

Also, it should be understood that any reference to an element herein using a designation such as "first," "second," and so forth does not generally limit the quantity or order of those elements. Rather, these designations may be used herein as a convenient method of distinguishing between two or more different elements. Thus, a reference to first and second elements does not mean that only two elements may be employed there or that the first element must precede the second element in some manner. Also, unless stated otherwise a set of elements may comprise one or more elements.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes (e.g., executable by at least one computer) relating to one or more of the aspects of the disclosure. In some aspects a computer program product may comprise packaging materials.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of erasure detection, comprising:
    receiving at least one pulse signal;
    determining information associated with pulse signals from successfully received packets;
    discarding at least some information associated with pulse signals from unsuccessfully received packets;
    determining at least one threshold based on the information associated with pulse signals from successfully received packets, and not on the discarded information associated with pulse signals from unsuccessfully received packets;
    determining whether to perform an erasure analysis of the at least one pulse signal;
    if it is determined to perform the erasure analysis of the at least one pulse signal:
    comparing at least one characteristic of the at least one pulse signal with the at least one threshold;
    designating the at least one pulse signal as at least one erasure based on the comparison; and
    if it is determined not to perform the erasure analysis of the at least one pulse signal, process the at least one pulse signal without designating it as at least one erasure.

2. The method of claim 1, wherein the at least one characteristic of the at least one pulse signal relates to at least one of the group consisting of:
    phase of the at least one pulse signal;
    frequency of the at least one pulse signal; and
    bandwidth of the at least one pulse signal.

3. The method of claim 1, wherein the information associated with pulse signals from successfully received packets comprises:
    an average of at least one characteristic of the pulse signals from successfully received packets,
    a windowed mean of the at least one characteristic of the pulse signals from successfully received packets,
    a weighted mean of the at least one characteristic of the pulse signals from successfully received packets, or
    a median of the at least one characteristic of the pulse signals from successfully received packets.

4. The method of claim 1, wherein the information associated with pulse signals from successfully received packets relates to at least one of the group consisting of:
    signal strength of the pulse signals from successfully received packets;
    amplitude of the pulse signals from successfully received packets;
    phase of the pulse signals from successfully received packets;
    frequency of the pulse signals from successfully received packets; and
    bandwidth of the pulse signals from successfully received packets.

5. The method of claim 1, further comprising repeatedly adapting the at least one threshold.

6. The method of claim 1, wherein the comparison comprises determining whether the at least one characteristic of the at least one pulse signal is greater than or equal to the at least one threshold.

7. The method of claim 1, wherein the comparison comprises determining whether the at least one characteristic of the at least one pulse signal is less than or equal to the at least one threshold.

8. The method of claim 1, wherein the comparison is based on:
an infinite impulse response filtered value of the at least one characteristic of the at least one pulse signal; or
a finite impulse response filtered value of the at least one characteristic of the at least one pulse signal.

9. The method of claim 1, wherein the at least one erasure comprises a Viterbi decision metric for a convolutional code.

10. The method of claim 1, wherein the designation of the received at least one pulse signal as at least one erasure is based on at least one previous comparison of another at least one pulse signal with the at least one threshold.

11. The method of claim 1, wherein the at least one pulse signal comprises at least one pulse position modulated signal.

12. The method of claim 11, wherein the comparison comprises comparing the at least one threshold with energy detected at least one pulse position defined for the at least one pulse position modulated signal.

13. The method of claim 11, further comprising:
summing energy levels detected at different pulse positions defined for the at least one pulse position modulated signal;
wherein the comparison comprises comparing the summed energy levels with the at least one threshold.

14. The method of claim 1, wherein the at least one pulse signal comprises a plurality of pulse signals.

15. The method of claim 14, wherein the designation of the pulse signals as at least one erasure is based on whether at least one characteristic of each of the pulse signals is greater than or equal to the at least one threshold.

16. The method of claim 14, wherein the designation of the pulse signals as at least one erasure is based on whether at least one characteristic of each of the pulse signals is less than or equal to the at least one threshold.

17. The method of claim 14, wherein the comparison comprises comparing a summation of the at least one characteristic of the pulse signals with the at least one threshold.

18. The method of claim 1, wherein:
the at least one pulse signal comprises at least one ultra-wideband pulse; and
the at least one ultra-wideband pulse has a fractional bandwidth on the order of 20% or more, has a bandwidth on the order of 500 MHz or more, or has a fractional bandwidth on the order of 20% or more and has a bandwidth on the order of 500 MHz or more.

19. The method of claim 1, further comprising commencing the designating of the at least one pulse signal as at least one erasure if a condition is met.

20. The method of claim 19, wherein the condition comprises acquiring information to initially define the at least one threshold.

21. The method of claim 1, further comprising ceasing the designating of the at least one pulse signal as at least one erasure if a condition is met.

22. The method of claim 21, wherein the condition comprises a majority of other pulses in a group of pulses not designated as erasures.

23. An apparatus for erasure detection, comprising:
a receiver configured to receive at least one pulse signal;
a threshold generator configured to:
determine information associated with pulse signals from successfully received packets;
discard at least some information associated with pulse signals from unsuccessfully received packets; and
generate at least one threshold based on information associated with pulses from successfully received packets, and not on the discarded information associated with pulses from unsuccessfully received packets; and
an erasure detector configured to:
determine whether to perform an erasure analysis of the at least one pulse signal; and
if it determines to perform the erasure analysis of the at least one pulse signal,
compare at least one characteristic of the at least one pulse signal with the at least one threshold; and
designate the at least one pulse signal as at least one erasure based on the comparison; or
if it determined not to perform the erasure analysis of the at least one pulse signal, not designate the at least one pulse signal as at least one erasure.

24. The apparatus of claim 23, wherein the at least one characteristic of the at least one pulse signal relates to at least one of the group consisting of:
phase of the at least one pulse signal;
frequency of the at least one pulse signal; and
bandwidth of the at least one pulse signal.

25. The apparatus of claim 23, wherein the information associated with pulse signals from successfully received packets comprises:
an average of at least one characteristic of the pulse signals from successfully received packets,
a windowed mean of the at least one characteristic of the pulse signals from successfully received packets,
a weighted mean of the at least one characteristic of the pulse signals from successfully received packets, or
a median of the at least one characteristic of the pulse signals from successfully received packets.

26. The apparatus of claim 23, wherein the information associated with pulse signals from successfully received packets relates to at least one of the group consisting of:
signal strength of the pulse signals from successfully received packets;
amplitude of the pulse signals from successfully received packets;
phase of the pulse signals from successfully received packets;
frequency of the pulse signals from successfully received packets; and
bandwidth of the pulse signals from successfully received packets.

27. The apparatus of claim 23, wherein the threshold generator is configured to repeatedly adapt the at least one threshold.

28. The apparatus of claim 23, wherein the comparison comprises determining whether the at least one characteristic of the at least one pulse signal is greater than or equal to the at least one threshold.

29. The apparatus of claim 23, wherein the comparison comprises determining whether the at least one characteristic of the at least one pulse signal is less than or equal to the at least one threshold.

30. The apparatus of claim 23, wherein the comparison is based on:
  an infinite impulse response filtered value of the at least one characteristic of the at least one pulse signal; or
  a finite impulse response filtered value of the at least one characteristic of the at least one pulse signal.

31. The apparatus of claim 23, wherein the at least one erasure comprises a Viterbi decision metric for a convolutional code.

32. The apparatus of claim 23, wherein the designation of the received at least one pulse signal as at least one erasure is based on at least one previous comparison of another at least one pulse signal with the at least one threshold.

33. The apparatus of claim 23, wherein the at least one pulse signal comprises at least one pulse position modulated signal.

34. The apparatus of claim 33, wherein the comparison comprises comparing the at least one threshold with energy detected at least one pulse position defined for the at least one pulse position modulated signal.

35. The apparatus of claim 33, wherein:
  the erasure detector is further configured to sum energy levels detected at different pulse positions defined for the at least one pulse position modulated signal; and
  the comparison comprises comparing the summed energy levels with the at least one threshold.

36. The apparatus of claim 23, wherein the at least one pulse signal comprises a plurality of pulse signals.

37. The apparatus of claim 36, wherein the designation of the pulse signals as at least one erasure is based on whether at least one characteristic of each of the pulse signals is greater than or equal to the at least one threshold.

38. The apparatus of claim 36, wherein the designation of the pulse signals as at least one erasure is based on whether at least one characteristic of each of the pulse signals is less than or equal to the at least one threshold.

39. The apparatus of claim 36, wherein the comparison comprises comparing a summation of the at least one characteristic of the pulse signals with the at least one threshold.

40. The apparatus of claim 23, wherein:
  the at least one pulse signal comprises at least one ultra-wideband pulse; and
  the at least one ultra-wideband pulse has a fractional bandwidth on the order of 20% or more, has a bandwidth on the order of 500 MHz or more, or has a fractional bandwidth on the order of 20% or more and has a bandwidth on the order of 500 MHz or more.

41. An apparatus for erasure detection, comprising:
  means for receiving at least one pulse signal;
  means for determining information associated with pulse signals from successfully received packets;
  means for discarding at least some information associated with pulse signals from unsuccessfully received packets;
  means for generating at least one threshold based on information associated with pulses from successfully received packets, and not on the discarded information associated with pulses from unsuccessfully received packets;
  means for determining whether to perform an erasure analysis of the at least one pulse signal;
  means for comparing at least one characteristic of the at least one pulse signal with the at least one threshold if it is determined to perform the erasure analysis of the at least one pulse signal; and
  means for designating the at least one pulse signal as at least one erasure based on the comparison if it is determined to perform the erasure analysis of the at least one pulse signal;
  means for not designating the at least one pulse signal as at least one erasure if it is determined not to perform the erasure analysis of the at least one pulse signal.

42. The apparatus of claim 41, wherein the at least one characteristic of the at least one pulse signal relates to at least one of the group consisting of:
  phase of the at least one pulse signal;
  frequency of the at least one pulse signal; and
  bandwidth of the at least one pulse signal.

43. The apparatus of claim 41, wherein the information associated with pulse signals from successfully received packets comprises:
  an average of at least one characteristic of the pulse signals from successfully received packets,
  a windowed mean of the at least one characteristic of the pulse signals from successfully received packets,
  a weighted mean of the at least one characteristic of the pulse signals from successfully received packets, or
  a median of the at least one characteristic of the pulse signals from successfully received packets.

44. The apparatus of claim 41, wherein the information associated with pulse signals from successfully received packets relates to at least one of the group consisting of:
  signal strength of the pulse signals from successfully received packets;
  amplitude of the pulse signals from successfully received packets;
  phase of the pulse signals from successfully received packets;
  frequency of the pulse signals from successfully received packets; and
  bandwidth of the pulse signals from successfully received packets.

45. The apparatus of claim 41, further comprising means for repeatedly adapting the at least one threshold.

46. The apparatus of claim 41, wherein the comparison comprises determining whether the at least one characteristic of the at least one pulse signal is greater than or equal to the at least one threshold.

47. The apparatus of claim 41, wherein the comparison comprises determining whether the at least one characteristic of the at least one pulse signal is less than or equal to the at least one threshold.

48. The apparatus of claim 41, wherein the comparison is based on:
  an infinite impulse response filtered value of the at least one characteristic of the at least one pulse signal; or
  a finite impulse response filtered value of the at least one characteristic of the at least one pulse signal.

49. The apparatus of claim 41, wherein the at least one erasure comprises a Viterbi decision metric for a convolutional code.

50. The apparatus of claim 41, wherein the designation of the received at least one pulse signal as at least one erasure is based on at least one previous comparison of another at least one pulse signal with the at least one threshold.

51. The apparatus of claim 41, wherein the at least one pulse signal comprises at least one pulse position modulated signal.

52. The apparatus of claim 51, wherein the comparison comprises comparing the at least one threshold with energy detected at least one pulse position defined for the at least one pulse position modulated signal.

53. The apparatus of claim 51, further comprising:
means for summing energy levels detected at different pulse positions defined for the at least one pulse position modulated signal;
wherein the comparison comprises comparing the summed energy levels with the at least one threshold.

54. The apparatus of claim 41, wherein the at least one pulse signal comprises a plurality of pulse signals.

55. The apparatus of claim 54, wherein the designation of the pulse signals as at least one erasure is based on whether at least one characteristic of each of the pulse signals is greater than or equal to the at least one threshold.

56. The apparatus of claim 54, wherein the designation of the pulse signals as at least one erasure is based on whether at least one characteristic of each of the pulse signals is less than or equal to the at least one threshold.

57. The apparatus of claim 54, wherein the comparison comprises comparing a summation of the at least one characteristic of the pulse signals with the at least one threshold.

58. The apparatus of claim 41, wherein:
the at least one pulse signal comprises at least one ultra-wideband pulse; and
the at least one ultra-wideband pulse has a fractional bandwidth on the order of 20% or more, has a bandwidth on the order of 500 MHz or more, or has a fractional bandwidth on the order of 20% or more and has a bandwidth on the order of 500 MHz or more.

59. A computer-program product for erasure detection, comprising:
a non-transitory computer-readable medium comprising codes executable by at least one computer to:
receive at least one pulse signal;
determine information associated with pulse signals from successfully received packets;
discard at least some information associated with pulse signals from unsuccessfully received packets;
determine at least one threshold based on the information associated with pulse signals from successfully received packets, and not on the discarded information associated with pulse signals from unsuccessfully received packets;
determine whether to perform an erasure analysis of the at least one pulse signal;
compare at least one characteristic of the at least one pulse signal with the at least one threshold if it is determined to perform the erasure analysis of the at least one pulse signal; and
designate the at least one pulse signal as at least one erasure based on the comparison if it is determined to perform the erasure analysis of the at least one pulse signal;
not designate the at least one pulse signal as at least one erasure if it is determined not to perform the erasure analysis of the at least one pulse signal.

60. A headset, comprising:
a receiver configured to receive at least one pulse signal;
a threshold generator configured to:
determine information associated with pulse signals from successfully received packets;
discard at least some information associated with pulse signals from unsuccessfully received packets; and
generate at least one threshold based on information associated with pulses from successfully received packets, and not on the discarded information associated with pulses from unsuccessfully received packets;
an erasure detector configured to:
determine whether to perform an erasure analysis of the at least one pulse signal; and
if it determines to perform the erasure analysis of the at least one pulse signal,
compare at least one characteristic of the at least one pulse signal with the at least one threshold; and
designate the at least one pulse signal as at least one erasure based on the comparison; or
if it determines not to perform the erasure analysis of the at least one pulse signal, not designate the at least one pulse signal as at least one erasure; and
a transducer configured to provide an audio output based on data received via the receiver.

61. A watch, comprising:
a receiver configured to receive at least one pulse signal;
a threshold generator configured to:
determine information associated with pulse signals from successfully received packets;
discard at least some information associated with pulse signals from unsuccessfully received packets; and
generate at least one threshold based on information associated with pulses from successfully received packets, and not on the discarded information associated with pulses from unsuccessfully received packets;
an erasure detector configured to:
determine whether to perform an erasure analysis of the at least one pulse signal; and
if it determines to perform the erasure analysis of the at least one pulse signal,
compare at least one characteristic of the at least one pulse signal with the at least one threshold; and further configured to
designate the at least one pulse signal as at least one erasure based on the comparison; or
if it determines not to perform the erasure analysis of the at least one pulse signal, not designate the at least one pulse signal as at least one erasure; and
a user interface configured to provide an indication based on data received via the receiver.

62. A sensing device for wireless communication, comprising:
an antenna;
a receiver configured to receive at least one pulse signal via the antenna;
a threshold generator configured to:
determine information associated with pulse signals from successfully received packets;
discard at least some information associated with pulse signals from unsuccessfully received packets; and
generate at least one threshold based on information associated with pulses from successfully received packets, and not on the discarded information associated with pulses from unsuccessfully received packets;
an erasure detector configured to:
determine whether to perform an erasure analysis of the at least one pulse signal; and
if it determines to perform the erasure analysis of the at least one pulse signal,
compare at least one characteristic of the at least one pulse signal with the at least one threshold; and further configured to
designate the at least one pulse signal as at least one erasure based on the comparison; or
if it determines not to perform the erasure analysis of the at least one pulse signal, not designate the at least one pulse signal as at least one erasure; and
a sensor configured to provide data to be transmitted via the antenna.

* * * * *